United States Patent
Wachtfogel et al.

(10) Patent No.: US 10,848,777 B2
(45) Date of Patent: *Nov. 24, 2020

(54) INTERLEAVED WATERMARKING

(71) Applicant: SYNAMEDIA LIMITED, Middlesex (GB)

(72) Inventors: David Wachtfogel, Jerusalem (IL); Michal Devir, Haifa (IL); Harel Cain, Jerusalem (IL)

(73) Assignee: Synamedia Limited, Middlesex (GB)

( * ) Notice: Subject to any disclaimer, the term of this patent is extended or adjusted under 35 U.S.C. 154(b) by 157 days.

This patent is subject to a terminal disclaimer.

(21) Appl. No.: 16/004,745

(22) Filed: Jun. 11, 2018

(65) Prior Publication Data

US 2018/0295376 A1    Oct. 11, 2018

Related U.S. Application Data

(63) Continuation of application No. 15/242,535, filed on Aug. 21, 2016, now Pat. No. 10,045,040.

(Continued)

(51) Int. Cl.
*H04N 19/467*    (2014.01)
*H04N 21/235*    (2011.01)
(Continued)

(52) U.S. Cl.
CPC ....... *H04N 19/467* (2014.11); *H04N 21/2347* (2013.01); *H04N 21/2351* (2013.01);
(Continued)

(58) Field of Classification Search
USPC ......................................................... 380/201
See application file for complete search history.

(56) References Cited

U.S. PATENT DOCUMENTS

| 8,611,531 B2 | 12/2013 | Joseph et al. | |
|---|---|---|---|
| 2005/0108763 A1* | 5/2005 | Baran | H04L 29/06027 725/87 |

(Continued)

FOREIGN PATENT DOCUMENTS

| EP | 2055102 B1 * | 8/2017 | ............. H04L 9/088 |
|---|---|---|---|
| EP | 2561478 B1 * | 2/2019 | ......... H04N 21/8358 |
| GB | 2500447 A * | 9/2013 | ............. H04N 21/85 |

*Primary Examiner* — Eleni A Shiferaw
*Assistant Examiner* — Sakinah White Taylor
(74) *Attorney, Agent, or Firm* — Merchant & Gould P.C.

(57) ABSTRACT

In one embodiment, a system includes a Headend apparatus including a watermark processor to generate secondary video streams from sections of a primary video stream, group the secondary video streams in groups of at least two secondary video streams, the secondary video streams including units of data for use in watermarking across cryptoperiods in an end-user device which selects one secondary video stream in each group for rendering as part of a composited video stream in order to embed units of data of an identification in the composited video stream, wherein in each cryptoperiod, the watermark processor is operative to generate different groups of the secondary video streams from different non-overlapping portions of the primary video stream, and an encryption processor to generate control words, encrypt each secondary video stream with a different control word, and change the control word of each secondary video stream every cryptoperiod.

20 Claims, 4 Drawing Sheets

Related U.S. Application Data

(60) Provisional application No. 62/317,564, filed on Apr. 3, 2016.

(51) Int. Cl.
  *H04N 21/2365* (2011.01)
  *H04N 21/2389* (2011.01)
  *H04N 21/2347* (2011.01)
  *H04N 21/8358* (2011.01)

(52) U.S. Cl.
  CPC ... *H04N 21/2365* (2013.01); *H04N 21/23892* (2013.01); *H04N 21/8358* (2013.01)

(56) References Cited

U.S. PATENT DOCUMENTS

| | | | |
|---|---|---|---|
| 2005/0117744 A1* | 6/2005 | Tapson | H04N 1/32165 380/28 |
| 2006/0188094 A1* | 8/2006 | Zwart | G11B 20/00086 380/42 |
| 2006/0195881 A1 | 8/2006 | Segev et al. | |
| 2008/0192927 A1 | 8/2008 | Stransky | |
| 2009/0086812 A1 | 4/2009 | Ducharme et al. | |
| 2010/0100742 A1 | 4/2010 | Courington et al. | |
| 2011/0075843 A1 | 3/2011 | Gremaud et al. | |
| 2011/0311044 A1* | 12/2011 | Westerveld | H04N 7/163 380/210 |
| 2012/0207300 A1 | 8/2012 | Karroumi | |
| 2015/0200773 A1* | 7/2015 | Sella | H04N 1/32144 380/277 |
| 2015/0326393 A1* | 11/2015 | Takashima | H04N 21/4408 380/30 |
| 2015/0356281 A1 | 12/2015 | Van Deventer et al. | |
| 2016/0173946 A1 | 6/2016 | Macchetti et al. | |
| 2019/0312915 A1* | 10/2019 | LaJoie | H04L 65/4076 |

* cited by examiner

INTERLEAVED WATERMARKING

RELATED APPLICATIONS

The present application is a continuation of U.S. patent application Ser. No. 15/242,535 filed Aug. 21, 2016, and claims the benefit of U.S. Provisional application No. 62/317,564 filed Apr. 3, 2016, the disclosures of both are considered part of and incorporated herein by reference.

TECHNICAL FIELD

The present disclosure generally relates to interleaved watermarking.

BACKGROUND

Interleave-based broadcast video watermarks are forensic watermarks whose payload uniquely identifies an end-user device and/or a subscriber potentially illegally streaming content over the internet. The watermarks are inserted at the broadcast headend to achieve a higher level of security, such that the video arrives at the end-user devices with the watermark signal already in the video.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
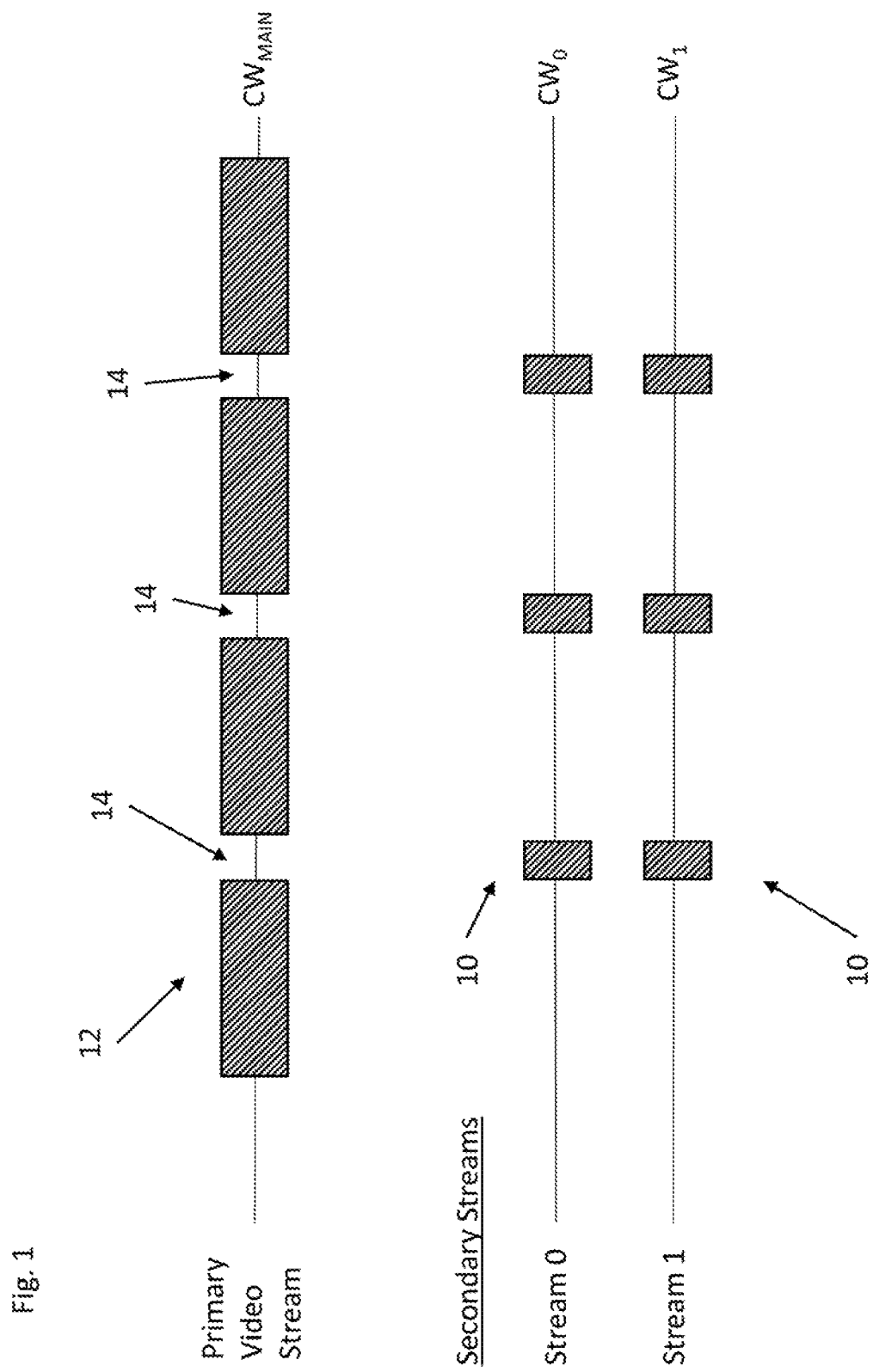
FIG. 1 is a view of interleaved watermarking using two secondary streams constructed and operative in accordance with an embodiment of the present disclosure.

There is provided in accordance with an embodiment of the present disclosure a broadcast Headend apparatus including a watermark processor to receive a primary video stream, and select a plurality of sections of the primary video stream in which to embed units of data for use in watermarking, generate a plurality of secondary video streams from the plurality of sections of the primary video stream as input, group the plurality of secondary video streams in a plurality of groups so that each one group of the plurality of groups includes at least two secondary video streams from the plurality of secondary video streams, the plurality of secondary video streams including units of data for use in watermarking across a plurality of cryptoperiods in an end user device which selects one secondary video stream from the at least two secondary video streams in each one group every one cryptoperiod of the plurality of cryptoperiods for rendering as part of a composited video stream in order to embed units of data of an identification in the composited video stream, wherein in each one cryptoperiod of the plurality of cryptoperiods the watermark processor is operative to generate different groups of the plurality of groups of secondary video streams from different non-overlapping portions of the primary video stream, and at least one secondary video stream of the at least two secondary video streams in a first group of the plurality of groups is different from each one of the at least two secondary video streams in a second group of the plurality of groups, and an encryption processor to generate a plurality of control words for each one of the plurality of secondary video streams, encrypt each one of the plurality of secondary video streams with a different control word of the plurality of control words, and change the different control word of each one of the plurality of secondary video streams every one cryptoperiod of the plurality of cryptoperiods.

There is also provided in accordance with another embodiment of the present disclosure an end-user device, including a receiver to receive a plurality of secondary video streams generated from a plurality of sections of a primary video stream as input, the plurality of secondary video streams being grouped in a plurality of groups so that each one group of the plurality of groups includes at least two secondary video streams from the plurality of secondary video streams, the plurality of secondary video streams including units of data for use in watermarking across a plurality of cryptoperiods, wherein in each one cryptoperiod of the plurality of cryptoperiods different groups of the plurality of groups of secondary video streams have been generated from different non-overlapping portions of the primary video stream, and at least one secondary video stream of the at least two secondary video streams in a first group of the plurality of groups is different from each one of the at least two secondary video streams in a second group of the plurality of groups, a demultiplexer to select one secondary video stream from the at least two secondary video streams in each one group for rendering as part of a composited video stream in order to embed units of data of an identification in the composited video stream, and an decryption processor to receive at least one entitlement control message for each of a plurality of cryptoperiods, for each one cryptoperiod of the plurality of cryptoperiods, generate a control word for decrypting the selected one secondary video stream in each one group for the one cryptoperiod based on the at least one entitlement control message of the one cryptoperiod, and for each one cryptoperiod of the plurality of cryptoperiods, decrypt the selected one secondary video stream in each one group based on the control word of the selected one secondary video steam of the one group.

Encoded Versus Encrypted

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
  encoded, but neither scrambled nor encrypted;
  compressed, but neither scrambled nor encrypted;
  scrambled or encrypted, but not encoded;
  scrambled or encrypted, but not compressed;
  encoded, and scrambled or encrypted; or compressed, and scrambled or encrypted.

Likewise, the terms "decoded" and "decompressed" on the one hand, and the terms "descram bled" and "decrypted" on the other hand, are used to refer to different and exclusive types of processing.

Definitions

A "reference frame", as used in the specification and claims, is defined as follows. If the decoding of a first video frame is at least partially dependent on video data of a second, now decompressed, video frame, then the second video frame is a reference frame of the first video frame. In older video encoding standards, such as MPEG-2, only one reference frame was used for P-frames and two reference frames were used for B-frames. Some modern video encoding standards, such as H.264/AVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. Note that different reference frames can be chosen for different macroblocks in the same frame. The maximum number of concurrent reference frames supported by H.264 is 16. Different reference frames can be chosen for a macroblock. Another video format that supports multiple reference frames is Snow, which can handle up to eight. The Theora codec provides a limited form of multiple reference frames, allowing references to both the preceding frame and the most recent intra frame.

DETAILED DESCRIPTION

Reference is now made to FIG. 1, which is a view of interleaved watermarking using two secondary streams 10 constructed and operative in accordance with an embodiment of the present disclosure.

FIG. 1 shows a primary video stream 12 encrypted with a control word $CW_{MAIN}$. One of the secondary streams 10, "Stream 0", is encrypted with a control word $CW_0$ and one of the secondary streams 10, "Stream 1", is encrypted with a control word $CW_1$. An end-user device receiving the secondary streams 10 and the primary video stream 12 is provided with at least one entitlement control message (ECM) which includes information for generating the control words, one for decrypting the primary video stream 12 and for decrypting the secondary streams 10. The ECM(s) is generated at a Headend. The ECM(s) is generated so that the control words that can be generated from the ECM(s) by end-user device enable decrypting the primary video stream 12 and one of the secondary streams 10 which includes a unit of data (e.g., a bit) which is associated with the end-user device (such as an ID of the end-user device or an ID of a subscriber using the end-user device). It should be noted that the ECM(s) generally include(s) information for generating control words for both of the secondary streams 10. However, a secure processor (for example, in a smart card or in the end-user device) is operative to generate a control word for one of the secondary streams 10. The secure processor is programmed with logic for deciding whether to generate $CW_0$ or $CW_1$. The logic is typically based on which bit of the ID is to be embedded. The knowledge of which bit needs to be embedded may be included in the ECM(s) or in an index encoded in the primary video stream 12, by way of example only. The secure processor also has access to the ID that needs to be embedded, for example, the ID may be embedded in the secure processor. So for example, if for a current cryptoperiod the unit of data that should be embedded in the video rendered by the end-user device is a zero, then the secure processor generates control word $CW_0$ of the Stream 0, and if for the current cryptoperiod the unit of data that should be embedded in the video rendered by the end-user device is a one, then the secure processor generates control word $CW_1$ of the Stream 1. In each subsequent cryptoperiod, the secure processor generates a control word so that selection of the secondary stream 10 for decrypting and rendering by the end-user device is performed based on the data which needs to be embedded in the resulting composited video stream for rendering by the end-user device.

Therefore, to embed payloads which are unique to end-user devices, the end-user devices are provisioned with control words or keys that allow the end-user devices to decrypt just one out of the two secondary stream versions in each cryptoperiod and perform an interleave operation by interleaving (concatenating) different portions from the two secondary streams 10 with the primary video stream 12. Therefore, resulting decrypted and decoded video in each end-user device is the concatenation of the primary video stream 12 with different selections from the secondary streams 10, with one of the secondary streams 10 being interleaved every cryptoperiod. The different combinations of video versions generated by the interleave operation in the end-user devices then serve to uniquely identify each end-user device, as the choice of which control words are produced during each cryptoperiod is determined based on an ID associated with each respective end-user device or a subscriber or smart card, by way of example only.

It should be noted that the interleaving of FIG. 1 is based on 'minimal interleave', such that the primary video stream 12 carries most of the video content and only relatively short portions 14 (one or more video frames or macroblocks or slices) of the primary video stream 12 are duplicated in the secondary streams 10, where the versions of the video actually differ. The portions 14 of the primary video stream 12 (now duplicated in the secondary streams 10) are not broadcast as part of the primary video stream 12 to the end-user devices. It should be noted that if the primary video stream 12 is not broadcast at all to the end-user devices, multiple versions of the video may be produced by longer sections of the secondary streams 10 which may be combined (interleaved) at cryptoperiod boundaries. Even when the primary video stream 12 is not broadcast at all, the secondary streams 10 are still referred to as secondary streams 10 for the sake of simplicity.

It should be noted that using two secondary streams 10 limits the number of data units to be embedded to one data unit every cryptoperiod. Typical durations of cryptoperiods are relatively long (8-10 seconds are quite common), and thus, the capacity of the watermark (how many payload bits of information can be embedded per time unit) is relatively low, because of the combination of the long cryptoperiod duration and the number of different versions of video that can be broadcast simultaneously, which is strongly limited by bandwidth considerations. However, a high watermark capacity is desirable not only to achieve fast detection times, but also to allow the use of special anti-collusion codes such as those of Boneh-Shaw, Tardos, Nuida and Furon. The anti-collusion property comes at the expense of much longer codes, such that encoding the ID of one subscriber out of a million subscribers would be a few hundred bits at least and not approximately 20 bits expected by information theory.

In FIG. 1, the two secondary streams 10 allow embedding 1 bit of information per cryptoperiod. The secondary streams 10 may include as many insertion points, corresponding to the portions 14 in the primary video stream 12 every cryptoperiod, as necessary to make the resulting watermark robust enough, for example, but not limited to, for error correction purposes.

The number of secondary streams 10 may be increased to embed more bits every cryptoperiod. For example, using four secondary streams, each stream may embed either 00, 01, 10 or 11 thereby enabling embedding 2 bits every cryptoperiod. In general, using a higher number of secondary streams 10 to embed k bits of information using $2^k$ secondary streams 10 requires a bandwidth of 2(k−1) times more than is used for two secondary streams 10. In this case as well, the secondary streams 10 include as many insertion points in the primary video stream 12 every cryptoperiod as necessary to make the resulting watermark robust enough. Each end-user device still needs to produce just two control words, one for the selected secondary stream 10 and one for the primary video stream 12.

Figure 2:
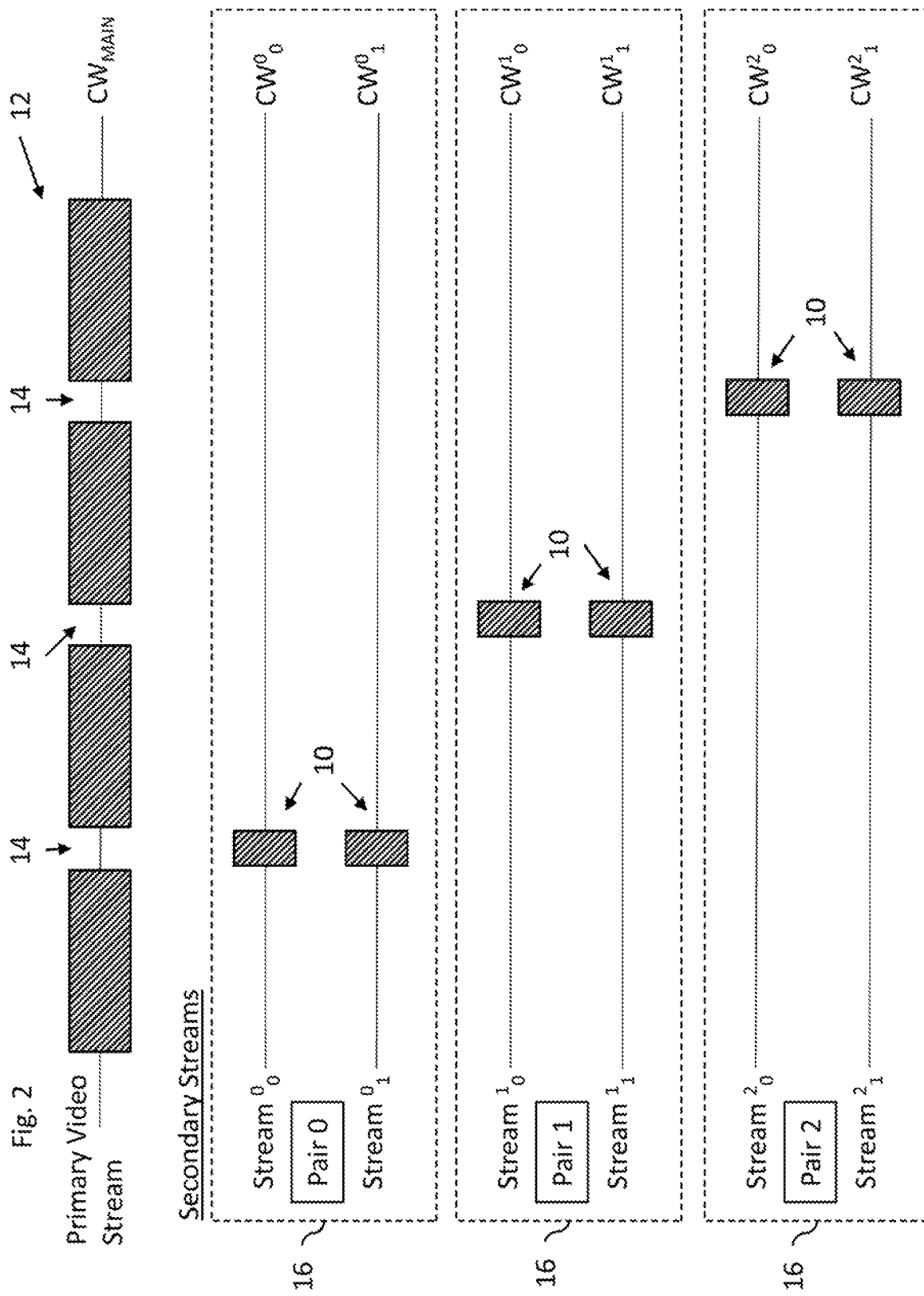
FIG. 2 is a view of interleaved watermarking using a plurality of pairs of time staggered secondary streams constructed and operative in accordance with an embodiment of the present disclosure.

Reference is now made to FIG. 2, which is a view of interleaved watermarking using a plurality of pairs 16 (which may be generalized to groups) of staggered secondary streams 10 constructed and operative in accordance with an embodiment of the present disclosure. Each pair 16 of the secondary streams 10 allows embedding either a zero or one, by way of example only, in the composited interleaved video output of the end-user device. Each of the secondary streams 10 has its own unique control word, for example, stream 1 of pair 1, denoted $Stream^1{}_1$ has a control word $CW^1{}_1$. In each cryptoperiod, a secondary stream 10 in each pair 16 is selected by the end-user device based on the control word generated by the secure processor from the ECM(s) prepared and sent by the headend. For each pair 16 of the secondary streams 10, the end-user device needs one control word every cryptoperiod. In the example of FIG. 2, three pairs 16 are shown (pair 0, pair 1 and pair 2). Therefore, the end-user device generates 3 control words every cryptoperiod in addition to the control word for the primary video stream 12. All the control words for the cryptoperiod may be generated from one or more ECMs received at the beginning, or prior to the start, of the cryptoperiod. The combination of the control words therefore enables the headend to force the end-user device to embed multiple bits every cryptoperiod. In the example of FIG. 2, 3 bits are embedded every cryptoperiod. FIG. 2 only shows one insertion point per pair 16 every cryptoperiod. However, it will be appreciated that each cryptoperiod may include more than one insertion point per pair 16. It will also be appreciated that the secondary streams 10 may be used without the primary video stream 12 as described above with reference to FIG. 1.

As the insertion points (corresponding to the portions 14) of the pairs 16 are staggered over the cryptoperiod, (thereby effectively sub-partitioning the cryptoperiod into "watermarking periods" which are shorter than the cryptoperiod), the bandwidth requirement of the secondary streams 10 of FIG. 2 is the same as in FIG. 1. In FIG. 2, the number of bits embedded is 3 times that of FIG. 1 without adding bandwidth overhead. In general, to embed k bits of information, k pairs 16 of the secondary streams 10 are used and k+1 control words are generated by each end-user device every cryptoperiod, k control words for the secondary streams 10 and one control word for the primary video stream 12.

It will be appreciated that any suitable number of pairs 16 may be used, thereby enabling a large number of bits to be embedded every cryptoperiod. The number of pairs 16 may be limited by the available insertion points in a cryptoperiod as well as hardware and/or software limitations for producing enough control words, for example, but not limited to, smart card limitations and/or data limitations in ECMs etc. It will also be appreciated that each pair 16 may be a group including more than two secondary streams 10. For example, using four secondary streams 10 per group could enable embedding two bits every watermark period, e.g., 00 or 01 or 10 or 11.

Seamless interleaving of the secondary streams 10 and the primary video stream 12 may be implemented. One option is to provide the insertion points at reference frames (e.g., I-frames) and duplicate the I-frames removed from the primary video stream 12 in the secondary streams 10 with appropriate changes for the embedding. Another option may be to remove a whole group of pictures (from and inclusive of an independently coded reference frame until just before the next independently coded reference frame) in the primary video stream 12 for duplication in the secondary streams 10.

Figure 3:
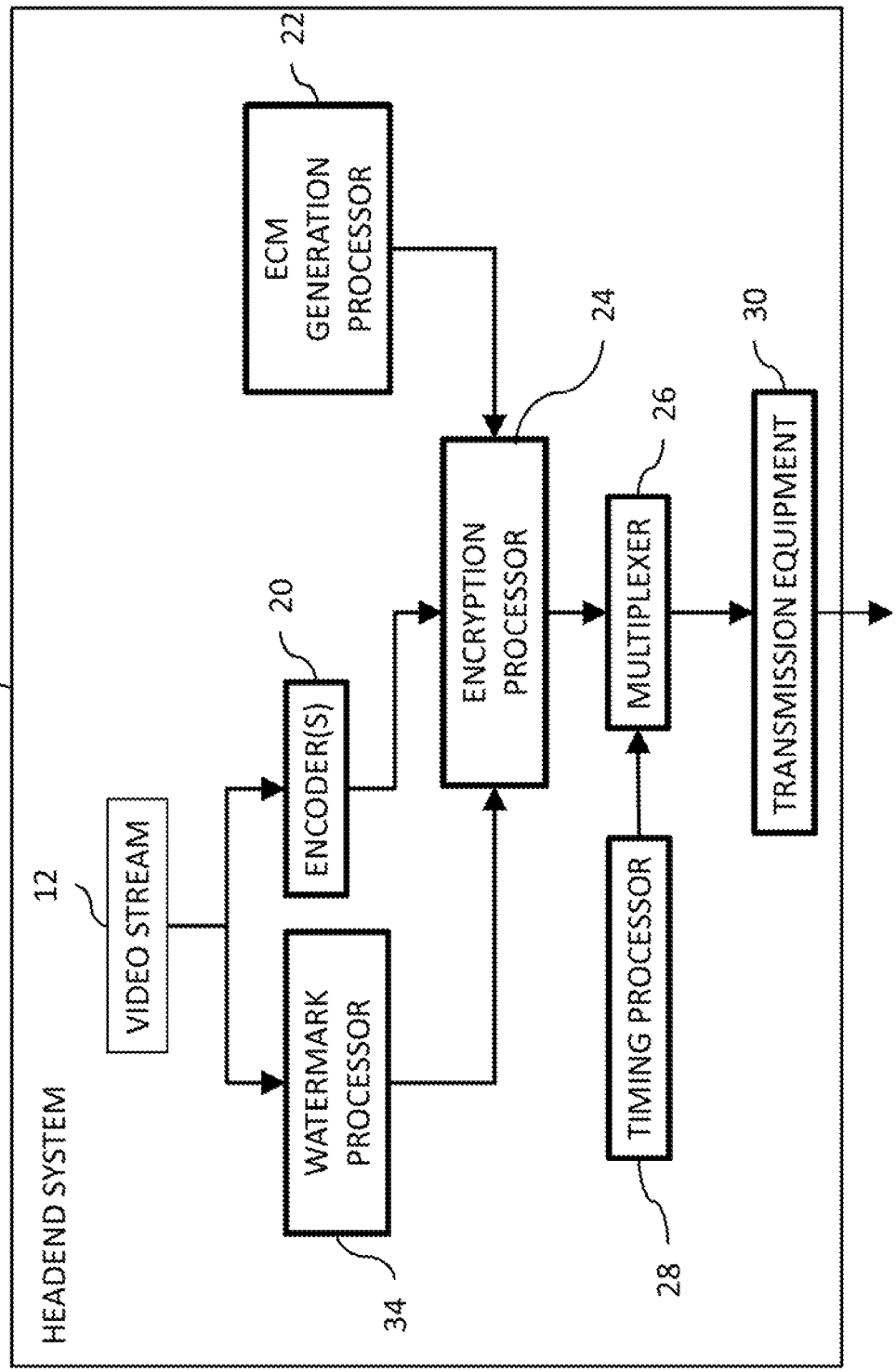
FIG. 3 is a view of a headend system constructed and operative in accordance with an embodiment of the present disclosure.

Reference is now made to FIG. 3, which is a view of a broadcast headend system 18 constructed and operative in accordance with an embodiment of the present disclosure. The headend 18 includes a watermark processor 34, one or more encoders 20, an ECM generation processor 22, an encryption processor 24, a multiplexer 26, a timing processor 28 and transmission equipment 30. The elements 34, 20, 22, 24, 26, 28, 30 may be combined together in any suitable combination implemented as one or more processors.

The encoders 20 are operative to receive and encode a primary video stream 12 (FIG. 2). The watermark processor 34 is operative to: receive the primary video stream 12; and select a plurality of sections of the primary video stream 12 (corresponding to portions 14 (FIG. 2)) in which to embed units of data for use in watermarking. The primary video stream 12 may either be received by the watermark processor 34 in an encoded state or a non-encoded state depending on the method used for embedding data in the secondary video streams 10 (FIG. 2). The watermark processor 34 is also operative to generate secondary video streams 10 (FIG. 2) from the sections of the primary video stream 12 as input. The secondary video steams 10 are grouped in a plurality of groups so that each group includes at least two secondary video streams 10. The secondary video streams 10 including units of data for use in watermarking across a plurality of cryptoperiods in an end user device which selects one secondary video stream 10 from the at least two secondary video streams 10 in each group every cryptoperiod for rendering as part of a composited video stream in order to embed units of data of an identification in the composited video stream. In each cryptoperiod, the watermark processor is operative to generate different groups of the secondary video streams 10 from different non-overlapping portions 14 of the primary video stream 12. In each cryptoperiod, each secondary video stream 10 in one group is different from each secondary video stream 10 in another group. The duplicated portions may be one or more frames, slices or macroblocks. By way of example only, in each group a first video stream of the secondary video streams 10 in that group includes a first unit of data and a second video stream of the secondary video streams 10 in that group includes a second unit of data different from the first unit of data. The watermark processor 34 may be operative to video encode the secondary video streams 10 if the secondary video streams 10 need video encoding.

The encryption processor 24 is operative to: generate a plurality of control words for each of the secondary video streams 10 (FIG. 2) and the primary video stream 12; encrypt each of the secondary video streams 10 (FIG. 2) with a different control word (so in each cryptoperiod each secondary video stream 10 is encrypted with a different control word); and encrypt the primary video stream 12 with its control word. The encryption processor 24 is operative to change the different control word of each secondary video stream 10 (FIG. 2) and the control word of the primary video steam every cryptoperiod.

The ECM generation processor 22 is operative to generate one or more entitlement control messages for each cryptoperiod. The entitlement control message(s) for each cryptoperiod include(s) information to enable the end-user devices to generate a control word for decrypting the secondary video stream 10 (FIG. 2) selected from each group in that cryptoperiod and one for the primary video stream 12 (FIG. 2) for that cryptoperiod. It should be noted that the ECM(s) generally include(s) information for generating control words for all the secondary streams 10 in a cryptoperiod. The different control words enable decryption of one secondary video stream 10 (FIG. 2) per group of the secondary video streams 10. The selected video streams when included in a composite video stream embed consecutive units of data of an identification associated with the end-user device, or a subscriber, or smart card, etc.

The timing processor 28 is operative to arrange the timing of the secondary video streams 10 (FIG. 2) in each cryptoperiod so that portions of the selected video streams 10 including the consecutive units of data are synchronized with watermarking gaps (the portions 14 (FIG. 2)) in the primary video stream 12. The timing processor 28 typically manages the synchronization by buffering the secondary video streams 10 with respect to the primary video stream 12.

The multiplexer 26 is operative to multiplex the secondary video streams 10 (FIG. 2) in a transport stream with the primary video stream 12. The transmission equipment 30 is operative to transmit the transport stream. As described above the primary video stream 12 may be omitted from the transport stream by ensuring that the secondary video streams 10 cover all parts of the primary video stream 12.

Figure 4:
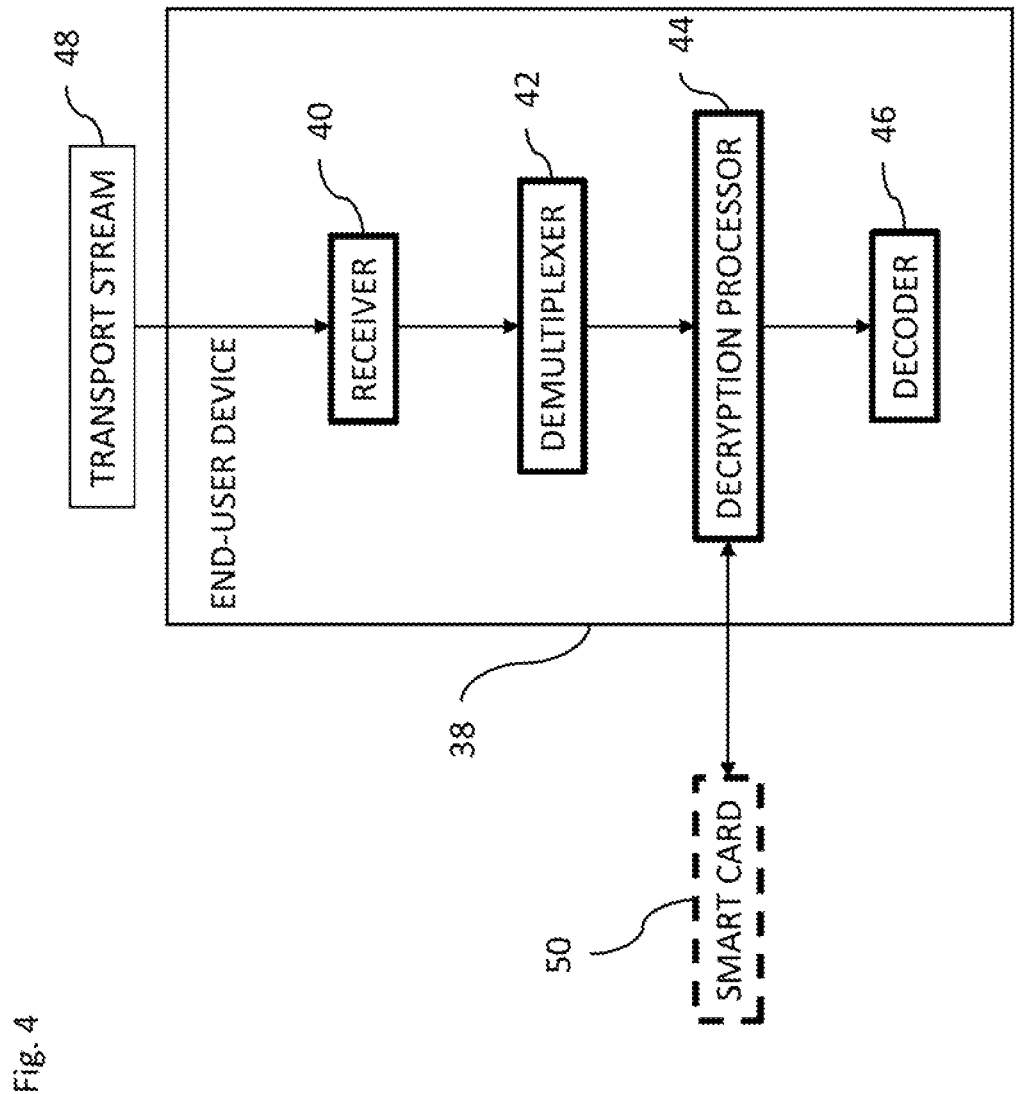
FIG. 4 is a view of an end-user device constructed and operative in accordance with an embodiment of the present disclosure.

Reference is now made to FIG. 4, which is a view of an end-user device 38 constructed and operative in accordance with an embodiment of the present disclosure. The end-user device 38 includes a receiver 40, a demultiplexer 42, a decryption processor 44 and a decoder 46.

The receiver 40 is operative to receive a transport stream 48 including the secondary video streams 10 (FIG. 2) (generated from a primary video stream) and the primary video stream 12 (FIG. 3). The secondary video streams 10 (FIG. 2) are generated as groups of video streams as described above with reference to FIG. 3.

The demultiplexer 42 is operative to demultiplex the secondary video streams 10 (FIG. 2) and the primary video stream 12 in the transport stream 48. The demultiplexer 42 is operative to select one secondary video stream 10 from the secondary video streams 10 in each group of secondary video streams for rendering as part of a composited video stream in order to embed units of data of an identification in the composited video stream.

The decryption processor 44 is operative to: receive one or more ECMs each cryptoperiod; and, for each cryptoperiod, generate different control word(s) for decrypting the selected secondary video stream 10 (FIG. 2) in each group and the primary video stream 12 (FIG. 3) for that cryptoperiod based on the ECM(s) of that cryptoperiod. It should be noted that the ECM(s) generally include(s) information for generating control words for all of the secondary streams 10. However, a secure processor (for example, in a smart card 50 or in the end-user device 38) is operative to generate one control word for each group (e.g., pair) of the secondary streams 10. The secure processor is programmed with the logic for deciding which control words to generate. The logic is typically based on which bit of the ID needs to be embedded corresponding to each secondary stream group. The knowledge of which bit needs to be embedded for each group may be included in the ECM(s) or in an index encoded in the primary video stream 12, by way of example only. The secure processor also has access to the ID that needs to be embedded, for example, the ID may be embedded in the secure processor. The decryption processor 44 is operative to: for each cryptoperiod, decrypt the selected secondary video stream 10 (FIG. 2) in each group based on the different control word(s); and for each cryptoperiod, decrypt the primary video stream 12 based on its control word. The selected video streams when included in a composite video stream embed at least two consecutive units of data of an identification associated with the end-user device 38 or subscriber or the smart card 50, in each respective cryptoperiod.

The decoder 46 is operative to decode the decrypted primary video stream 12 and the decrypted selected secondary video stream 10 of each group as a composited interleaved video stream.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

We claim:

1. An apparatus comprising:
a watermark processor operative to:
select a plurality of sections of a primary video stream in which to embed units of data for use in watermarking;
generate a plurality of secondary video streams from the plurality of sections of the primary video stream as input, wherein the watermark processor being operative to generate the plurality of secondary video streams comprises the watermark processor being operative to duplicate the plurality of sections of the primary video stream to generate the plurality of secondary video streams, and wherein the plurality of sections of the primary video stream duplicated to generate the plurality of secondary video streams are not broadcast as a part of the primary video stream;
an encryption processor operative to:
generate a plurality of control words for each one of the plurality of secondary video streams;
encrypt each one of the plurality of secondary video streams with a different control word of the plurality of control words;
change the different control word of each one of the plurality of secondary video streams every one cryptoperiod of a plurality of cryptoperiods;
generate a control word for a primary video stream;
encrypt the primary stream with the control word for the primary video stream; and
change the control word for the primary video stream every one cryptoperiod of the plurality of cryptoperiods; and
a timing processor operative to arrange a timing of the plurality of secondary video streams in each of the plurality of cryptoperiods so that portions of the plurality of secondary video streams including units of data for use in watermarking are synchronized with a plurality of watermarking gaps in the primary video stream.

2. The apparatus according to claim 1, wherein the watermark processor is further operative to:
group the plurality of secondary video streams in a plurality of groups so that each one group of the plurality of groups includes at least two secondary video streams from the plurality of secondary video streams, the plurality of secondary video streams including the units of data for use in watermarking across the plurality of cryptoperiods, wherein in each one cryptoperiod of the plurality of cryptoperiods the watermark processor is operative to generate different groups of the plurality of groups of secondary video streams from different non-overlapping portions of the primary video stream and wherein in each one cryptoperiod of the plurality of cryptoperiods at least one secondary video stream of the at least two secondary video streams in a first group of the plurality of groups is different from each one of the at least two secondary video streams in a second group of the plurality of groups.

3. The apparatus according to claim 2, wherein an end user device selects one secondary video stream from the at least two secondary video streams in each one group every one cryptoperiod of the plurality of cryptoperiods for rendering as part of a composited video stream in order to embed the units of data of an identification in the composited video stream.

4. The apparatus according to claim 2, wherein each one of the at least two secondary video streams in a first group of the plurality of groups is different from each one of the at least two secondary video streams in a second group of the plurality of groups.

5. The apparatus according to claim 2, further comprising an entitlement control message generation processor to generate at least one entitlement control message for each of the plurality of cryptoperiods, the at least one entitlement control message for each one cryptoperiod including information to enable an end-user device to generate a control word for the one cryptoperiod for decrypting the one secondary video stream in each one group.

6. The apparatus according to claim 2, further comprising a multiplexer to multiplex the plurality of secondary video streams in a transport stream.

7. The apparatus according to claim 2, wherein a first video stream of the plurality of secondary video streams in one group of the plurality of groups includes a first unit of data and a second video stream of the plurality of secondary video streams in the one group of the plurality of groups includes a second unit of data different from the first unit of data.

8. The apparatus according to claim 2, wherein in each one cryptoperiod of the plurality of cryptoperiods each one of the plurality of secondary video streams is encrypted with a different control word.

9. A method comprising:
receiving a primary video stream and a plurality of secondary video streams, the plurality of second video streams generated from a plurality of sections of the primary video stream, the plurality of secondary video streams being grouped in a plurality of groups, each group of the plurality of groups comprising at least two secondary video streams from the plurality of secondary video streams, the plurality of secondary video streams comprising units of data for watermarking across a plurality of cryptoperiods, wherein in each cryptoperiod of the plurality of cryptoperiods different groups of the plurality of groups of secondary video streams have been generated from different non-overlapping portions of the primary video stream, and wherein in the each cryptoperiod of the plurality of cryptoperiods at least one secondary video stream of the at least two secondary video streams in a first group of the plurality of groups is different from each one of the at least two secondary video streams in a second group of the plurality of groups;

selecting one secondary video stream from the at least two secondary video streams in each one group for rendering as part of a composited video stream in order to embed the units of data of an identification in the composited video stream;

receiving at least one entitlement control message for each of the plurality of cryptoperiods;

for each one cryptoperiod of the plurality of cryptoperiods, generating a control word for decrypting the selected one secondary video stream in each one group for the one cryptoperiod based on the at least one entitlement control message of the one cryptoperiod;

for each one cryptoperiod of the plurality of cryptoperiods, decrypting the selected one secondary video stream in each one group based on the control word of the selected one secondary video steam of the one group;

for each one cryptoperiod of the plurality of cryptoperiods, generating a control word for the primary video stream for the one cryptoperiod based on the at least one entitlement control message of the one cryptoperiod; and for each one cryptoperiod of the plurality of cryptoperiods, decrypting the primary video stream based on the control word of the primary video stream; and wherein portions of the plurality of secondary video streams including the units of data are synchronized with a plurality of watermarking gaps in the primary video stream.

10. The method according to claim 9, wherein each one of the at least two secondary video streams in a first group of the plurality of groups is different from each one of the at least two secondary video streams in a second group of the plurality of groups.

11. The method according to claim 9, further comprising decoding the selected one secondary video stream in each one group for rendering as part of the composited video stream embedding the units of data of the identification in the composited video stream.

12. The method according to claim 9, wherein a first video stream of the plurality of secondary video streams in one group of the plurality of groups includes a first unit of data and a second video stream of the plurality of secondary video streams in the one group of the plurality of groups includes a second unit of data different from the first unit of data.

13. A method comprising:

selecting a plurality of sections of a primary video stream in which to embed units of data for use in watermarking;

generating a plurality of secondary video streams from the plurality of sections of the primary video stream as input, wherein the watermark processor being operative to generate the plurality of secondary video streams comprises the watermark processor being operative to duplicate the plurality of sections of the primary video stream to generate the plurality of secondary video streams, and wherein the plurality of sections of the primary video stream duplicated to generate the plurality of secondary video streams are not broadcast as a part of the primary video stream;

generating a plurality of control words for each one of the plurality of secondary video streams;

encrypting each one of the plurality of secondary video streams with a different control word of the plurality of control words;

changing the different control word of each one of the plurality of secondary video streams every one cryptoperiod of a plurality of cryptoperiods;

generating a control word for a primary video stream;

encrypting the primary stream with the control word for the primary video stream;

changing the control word for the primary video stream every one cryptoperiod of the plurality of cryptoperiods; and arranging a timing of the plurality of secondary video streams in each of the plurality of cryptoperiods so that portions of the plurality of secondary video streams including units of data for use in watermarking are synchronized with a plurality of watermarking gaps in the primary video stream.

14. The method according to claim 13, further comprising:

grouping the plurality of secondary video streams in a plurality of groups so that each one group of the plurality of groups includes at least two secondary video streams from the plurality of secondary video streams, the plurality of secondary video streams including the units of data for use in watermarking across a plurality of cryptoperiods, wherein in each one cryptoperiod of the plurality of cryptoperiods different groups of the plurality of groups of secondary video streams are generated from different non-overlapping portions of the primary video stream and wherein in each one cryptoperiod of the plurality of cryptoperiods at least one secondary video stream of the at least two secondary video streams in a first group of the plurality of groups is different from each one of the at least two secondary video streams in a second group of the plurality of groups.

15. The method according to claim 14, further comprising selecting, by an end use device, one secondary video stream from the at least two secondary video streams in each one group every one cryptoperiod of the plurality of cryptoperiods for rendering as part of a composited video stream in order to embed the units of data of an identification in the composited video stream.

16. The method according to claim 14, wherein each one of the at least two secondary video streams in a first group of the plurality of groups is different from each one of the at least two secondary video streams in a second group of the plurality of groups.

17. The method according to claim 14, further comprising generating at least one entitlement control message for each of the plurality of cryptoperiods, the at least one entitlement control message for each one cryptoperiod including information to enable an end-user device to generate a control word for the one cryptoperiod for decrypting the one secondary video stream in each one group.

18. The method according to claim 14, further comprising multiplexing the plurality of secondary video streams in a transport stream.

19. The method according to claim 14, wherein a first video stream of the plurality of secondary video streams in one group of the plurality of groups includes a first unit of data and a second video stream of the plurality of secondary video streams in the one group of the plurality of groups includes a second unit of data different from the first unit of data.

20. The method according to claim 14, wherein in each one cryptoperiod of the plurality of cryptoperiods each one of the plurality of secondary video streams is encrypted with a different control word.

* * * * *